(12) United States Patent
Neily et al.

(10) Patent No.: US 6,639,682 B2
(45) Date of Patent: Oct. 28, 2003

(54) SYSTEM OF FABRICATING PLANE PARALLEL SUBSTRATES WITH UNIFORM OPTICAL PATHS

(75) Inventors: Richard A. Neily, Kars (CA); William McCreath, Stittsville (CA)

(73) Assignee: GSI Lumonics, Inc., Kanata (CA)

( * ) Notice: Subject to any disclaimer, the term of this patent is extended or adjusted under 35 U.S.C. 154(b) by 0 days.

(21) Appl. No.: 09/872,303

(22) Filed: Jun. 1, 2001

(65) Prior Publication Data

US 2001/0053588 A1 Dec. 20, 2001

Related U.S. Application Data

(60) Provisional application No. 60/208,863, filed on Jun. 2, 2000.

(51) Int. Cl.[7] .............................................. G01B 11/06
(52) U.S. Cl. ...................................... 356/504; 356/632
(58) Field of Search ................................. 356/504, 632

(56) References Cited

U.S. PATENT DOCUMENTS

| | | | |
|---|---|---|---|
| 5,327,220 A | 7/1994 | Erickson | |
| 5,396,332 A * | 3/1995 | Ciszek | 250/559.27 |
| 5,528,370 A | 6/1996 | Tracy et al. | |
| 5,620,357 A | 4/1997 | Misaka et al. | |
| 5,671,050 A | 9/1997 | de Groot | |
| 5,724,137 A | 3/1998 | Tronolone et al. | |
| 5,751,427 A | 5/1998 | de Groot | |
| 5,923,425 A | 7/1999 | Dewa et al. | |
| 6,048,742 A | 4/2000 | Weybourne et al. | |
| 6,198,293 B1 | 3/2001 | Woskov et al. | |
| 6,301,009 B1 * | 10/2001 | Tinker | 356/511 |

* cited by examiner

*Primary Examiner*—Constantine Hannaher
(74) *Attorney, Agent, or Firm*—Maine & Asmus

(57) ABSTRACT

Process and apparatus for automated production of optical devices comprising two plane parallel optical surfaces of a desired optical performance for transmitted light, by measuring and quantifying the spectral response of intensity versus wavelength across the working surface area of a starter optical device as compared to an acceptable computer model, as a three dimensional contour map of optical thickness based on the assumption of a constant index of refraction, then reducing the high spots by automated means such as polishing, and measuring the spectral response again.

39 Claims, 4 Drawing Sheets

SYSTEM OF FABRICATING PLANE PARALLEL SUBSTRATES WITH UNIFORM OPTICAL PATHS

This application relates and claims priority for all purposes to pending U.S. application Ser. No. 60/208,863, filed Jun. 2, 2000.

TECHNICAL FIELD OF THE INVENTION

The present invention relates to a method and apparatus for producing plane parallel optical substrates with uniform optical path characteristics; and in particular, to a system for measuring and quantifying the optical path variations over the surface area of a plane parallel optical blank as compared to a data model of the desired result, coupled with automated localized reductions of substrate thickness of the optical blank to match the model's optical performance.

BACKGROUND OF THE INVENTION

It is well known that the fundamental principles of Fabry-Perot interferometers provide a means of quantifying the reflective and transmissive characteristics of optical surfaces. A pair of plane parallel surfaces that are at a fixed distance apart, such as the top and bottom surfaces of a layer of transparent material like glass, suspended in air, exhibit constructive and destructive interference when a light source is introduced. When constructive interference occurs, a maximum amount of light is transmitted through the optical surfaces, while a minimum amount of light is reflected. When destructive interference occurs, a minimum of light is transmitted and the maximum is reflected.

There are a number of parameters that determine the reflective and transmissive properties. As incident light is scanned through a range of wavelengths, the transmitted and reflected components both have a sinusoidal variation of intensity—with one being 180 degrees shifted in phase relative to the other. The period or peak to peak spacing of the sinusoidal pattern is not constant, but varies as a function of the wavelength of the light, the separation of the optical surfaces, and the refractive index of the medium between the surfaces.

There have been various attempts to improve optical surfaces and optimize the response of optical surfaces and other precision surfaces such as of semiconductor wafers. The process of spectro-reflectance is well described in the prior art. Spectro-reflectance is a process of directing a light beam at a surface and measuring the intensity of the reflections as a function of wavelength. The index of refraction of the deposited layers of a semiconductor wafer alters the direction of the reflected beam so that the thickness of the layers can be determined by measuring the deviation of the reflected beam path. The following references may provide useful context to the reader for understanding the invention that follows.

A spectro-reflectance process for measuring the thickness and composition of semiconductor wafer layers is described in Weyburne's U.S. Pat. No. 6,048,742, published Apr. 11, 2000. A light source is directed at the wafer surface at a known angle off normal, and the angles of reflections are recorded at a photodiode array. The subject wafer is situated on a X-Y stage allowing the wafer can be moved in a stepped pattern so that multiple measurement points can be analyzed. The reflectivity data permits mapping and analysis of the wafer layer construction.

In de Groot's U.S. Pat. No. 5,751,427, published May 12, 1998, a method of measuring the gap between adjacent optical surfaces of two different devices is disclosed. A light source of a wavelength greater than the gap to be measured is directed at an oblique angle towards the first device. The light transmitted through the first device and reflected off the adjacent optical surfaces of the two devices is measured by an intensity detector and a phase detector. Based upon these measurements, the spacing or gap between the surfaces is computed. And, by altering the gap between the surfaces, '427 processes the data to calculate the index of refraction.

Another process for measuring variations in thickness of an optical element of an etalon is described in Tracy's U.S. Pat. No. 5,528,370, published Jun. 18, 1996. A light source of a particular wavelength is directed to the etalon via a mirror, and the output is directed to a splitter. As described by Tracy, by way of well known optical phenomena, a Fabry-Perot interference pattern is effected at the etalon by multiple reflections of the narrow-band radiation between the two surfaces of the etalon. A microscope observes the diffracted beam from the sample off the splitter and measures the surface variations. If the flatness and parallelism of the etalon surfaces are perfect, the intensity at the etalon as seen through the microscope will be uniform and depend on the path wavelength and the exact thickness of the etalon. If there is any variation of thickness, due to wedge shape and/or variations in flatness, an optical interference fringe pattern will be seen through the microscope. The fringes will be parallel if the etalon is wedge shaped, and circular or oval if the etalon has a peak or depression in a surface.

A fringe pattern discriminator is disclosed in Tronolone's U.S. Pat. No. 5,724,137, published Mar. 3, 1998, where a light source interacts with an interferometer through two optical diffraction gratings between which the target object is suspended. The interferogram are recorded by an imaging system. The interferogram encompasses both the object fringes and the interference fringes caused solely by the gratings. By lateral movement of the gratings relative to the object, the system can distinguish between the object fringes and the interference fringes.

A similar type of invention is disclosed in Erickson's U.S. Pat. No. 5,327,220, published Jul. 5, 1994. In accordance with this invention, the thickness of optical parts is measured by using a light source in conjunction with an interferometer, where the light source is reflected off the optical surfaces, and the imaging system measures the reflected fringes and interference rings. A computer processes the results to calculate the thickness change by observing the slope of the intensity variation. The '220 patent also discloses rotating the optical component to map the results.

Misaka's U.S. Pat. No. 5,620,357, published Apr. 15, 1997, describes a polishing method for reducing wafer taper in a single large wafer polishing machine. Wafer thickness is measured and corrections made by a robotic setup for polishing the wafer surface to reduce or remove the taper, by comparing the center of the wafer to the center of the compressive load caused by the taper; the offset providing an indication of the taper characteristics.

What is needed is a precise and effective means of measuring and correcting the variations in optical path characteristics over a pair of plane and parallel optical surfaces. Such a system should facilitate the automated reduction in thickness of the areas of irregular optical path performance to match an ideal optical performance profile. Ideally, the system would have a single controller making the measurements and coordinating the reduction of the selected areas of the optical surfaces, in order to match the optical characteristics to a model performance profile.

SUMMARY OF THE INVENTION

Accordingly, it is an object of the invention to provide a method and apparatus for producing optical plates of uniform optical performance and limited optical transmission path surface variation, by repetitively measuring and reducing optical plate blanks to match a data model of the optical performance of an ideal plate or design template having a particular, pre-selected uniform optical transmission path characteristic across its surface.

The optical transmission path characteristic of a light beam at any point on the plate is a function of the thickness of the plate and refractive index of the plate material. Once plate thickness and refractive index are established, a variation in wavelength of the light source alters the intensity of the reflected and transmitted light in a predictable manner. Conversely, application of light of varying wavelength, causing measurable variations in the intensity of reflected or transmitted light, provides a composite index or indicator of plate thickness and refractive index.

A basic formula for interference in a transmission is $m\lambda=2nd \cos\theta$, where:

m=order of interference
$\lambda$=free space wavelength
n=index of refraction
d=distance between optical surfaces
$\theta$=angle of incidence of the light source Using certain assumptions, namely that $\theta=0$ degrees or $\cos\theta=1$; and the variation of n with respect to wavelength is constant.

The underlying principle is that if a plane parallel plate, such as a $SiO_2$ plate, is measured by a detector in multiple places, where the only variables are the plate thickness and refractive index and the shift in the position of the interference peak is measured, then the change in the optical path of the plate can be determined.

For example, consider interference peak number m; at a first position, $m\lambda_1=2 n d_1$, and at a second position, $m\lambda_2=2 n d_2$.

Solving for the thickness difference;

$(2 n d_1)/\lambda_2 = 2 n d_2$
$d_2=(d_1\lambda_2)/\lambda_1$
$\Delta d=d_2-d_1$
$\Delta d=(d_1\lambda_2)/\lambda_1-d_1$
$\Delta d=d_1(\lambda_2/\lambda_1-1)$ In accordance with the invention, an optical plate blank is subjected to light from a light source from one side for transmission through the two plane parallel surfaces of the plate, the transmission wavelength of which is determinable by any suitable means, and the transmission pass-through intensity of which is measurable by a suitably aligned optical receiver on the other side of the plate.

Quantifiable variations in the optical path transmission performance over the surface area of the plate are determinable by making these wavelength and intensity measurements at different points on the plate, as is further explained below. Accordingly, the plate blank is repositioned laterally with respect to the light beam for successive wavelength and intensity readings so as to provide a sufficiently high density, uniformly distributed grid pattern of optical transmission path intensity and wavelength readings which constitute an initial data matrix or contour map of optical transmission path data for the optical blank.

The exact cause of variations in the transmission path characteristic matrix of the optical blank is irrelevant for the purpose of the invention; it may be a localized difference in plate thickness or variation in the refractive index or combination of both. The actual thickness of the blank is also irrelevant, as is apparent from the previous discussion. For purposes of the invention, the variable selected by the applicants for localized adjustment to the optical transmission characteristic is the difference in plate thickness at each point on the grid. For this reason, the refractive index is assumed to be constant, and calculations fundamental to the invention proceed around this assumption.

The analytical process applied to each set of coordinates of the grid pattern is based on an ideal optical computer model of similar construction, designed in software using an optical modeling program. The computer model represents an optical specification to which the user wants to produce actual optical plates from pre-formed optical blanks of slightly excessive thickness. The known and initially measured parameters of the optical blank under test, with refractive index assumed to be constant, are compared to the computer model to generate an apparent actual thickness, or optical thickness, for each coordinate point of the grid. The sum of this data is a contour map of the optical thickness of the blank. Using this database contour map, an automated localized reduction process such as ion beam milling operation or a surface polishing operation is performed on the optical blank to reduce the thickness of localized areas identified by the comparison, to more closely match all points on the surface of the blank to the optical performance of the computer model. Multiple iterations of the measuring and reduction process are conducted until the optical blank is sufficiently and uniformly close in performance across its entire surface to the computer model.

It is therefore an objective of the invention to provide both process and apparatus for the automated production of devices having plane parallel optical surfaces of desired optical performance, where there are incorporated steps and means for measuring the intensity and wavelength of a light transmitted through the optical surfaces at several points of known spatial orientation, calculating the optical thickness between optical surfaces at each point by comparing the wavelength and intensity measurements to a computer model of desired optical performance while assuming the refractive index of the plane parallel optical surfaces is constant, and reducing the actual thickness between the optical surfaces at selected high points so as to reduce the variation in optical thickness between the optical surfaces.

Still other objects and advantages of the present invention will become readily apparent to those skilled in this art from the following detailed description, wherein only a preferred embodiment of the invention is described, simply by way of illustration of the best mode contemplated by us for carrying out the invention. As will be realized, the invention is capable of other and different embodiments, and its several details are capable of modifications in various obvious respects, all without departing from the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE PREFERRED EMBODIMENT

The invention is susceptible of many embodiments, both in method and apparatus. What follows are descriptions of preferred embodiments, reflecting the best mode for practicing the invention.

Figure 1:
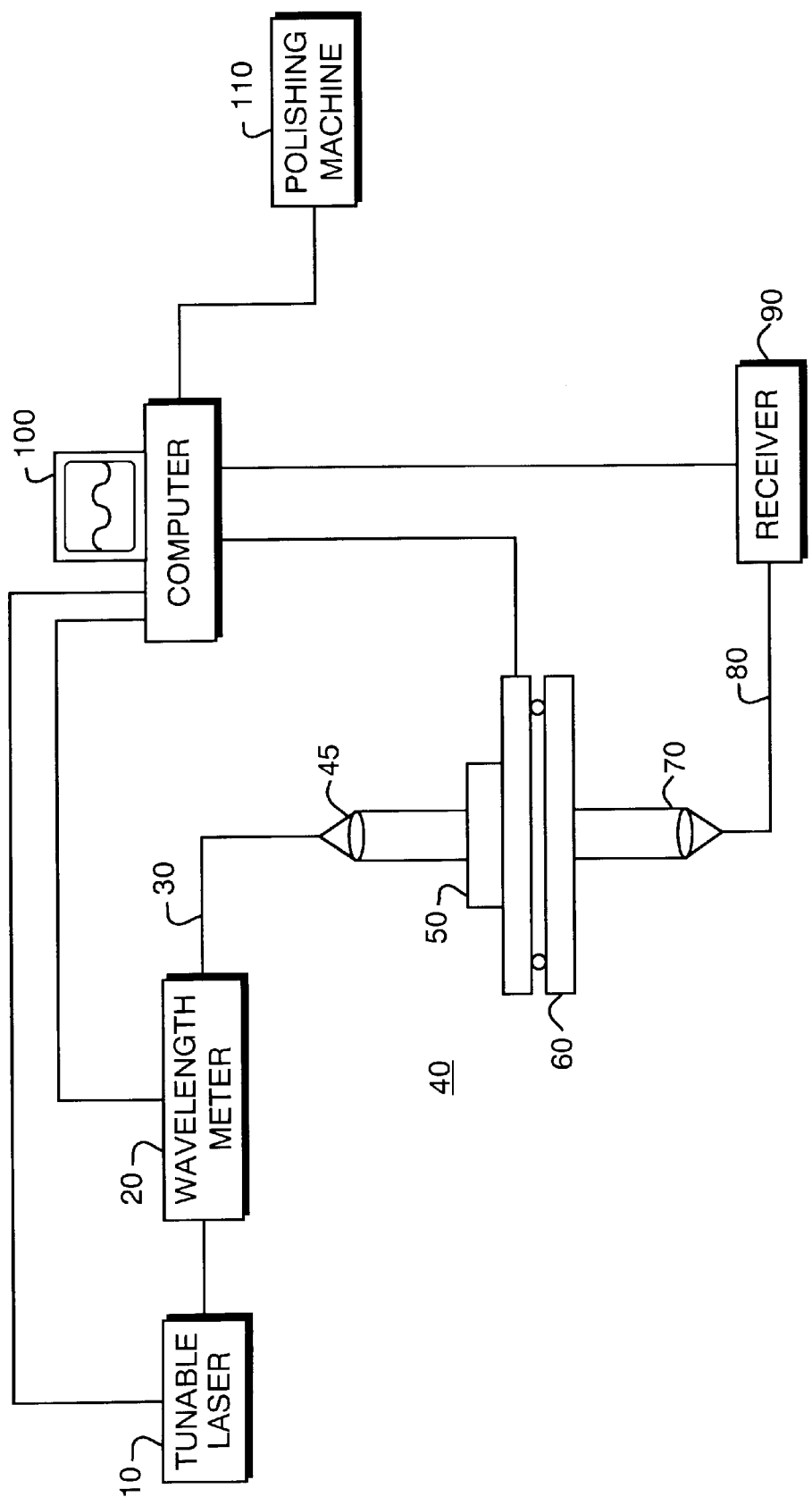
FIG. 1 is a basic block diagram of a preferred embodiment apparatus of the invention, using a laser light source and precision wavelength meter.

Referring to FIG. 1, a tunable laser source 10 is connected to a wavelength meter 20. The wavelength meter 20 is only necessary to make a high precision measurement of the wavelength, as laser source 10 does not provide such accuracy. It is within the scope of the invention to operate without a wavelength meter, provided the laser source has sufficient accuracy and tolerance as to provide an accurate wavelength setting. In the preferred embodiment the laser source and the wavelength meter are combined into a single commercial unit, namely a JDS Uniphase SWS15100. The applicants make no claim as to this or any commercial equipment nomenclature cited herein as to trademark rights, or suitability for any purpose.

The laser beam is directed via a fiber optic cable 30 to a collimating lens 45 that transmits the beam of light to the optical plate blank 50. Blank 50 is typically fabricated in the range of 0.5 to 4 millimeters in thickness, and more particularly about 100 to 200 nanometers in excess thickness as compared to the expected final thickness. The plate fixture 40 retains optical plate 50 in a suitable holder which has a hole in the center allowing the light beam to pass thru the plate, holder, and plate fixture 40. The optical plate 50 may or may not have a constant index of refraction or a known actual thickness.

The optical device of the invention may be defined more generally as three layers of optically transparent materials, the interfaces of which define two plane parallel optical surfaces. While the preferred embodiments describe an optical plate 50 which is a solid, it will be readily apparent to those skilled in the art that this refers specifically to the middle layer, there being a presumption for this embodiment that the other to layers are open air. The optical device, apparatus, and methodology could be otherwise configured, as is apparent from the general definition, and still be within the scope of the invention. For example, other mediums including solids, liquids and gases are possible and are within the scope of the invention; the method apparatus, of course, being suitably adapted to the specifics of the user's requirement.

Plate fixture 40 is capable of movement in the X and Y direction to effectively move the optical plate 50 laterally with respect to the light beam. A typical X-Y stage 60 incorporates electrical stepping motors to move the plate in a pre-determined grid pattern as controlled by the computer 100.

The light transmitted through the plate fixture 40 is directed through an output collimating lens 70 and into a fiber optic output cable 80. The light receiver 90 is connected to the fiber optic cable 80 and measures the intensity of the transmitted light. The receiver is also connected to computer 100 which processes the data from the receiver 90. In the preferred embodiment, the receiver is a JDS Uniphase two channel receiver.

Computer 100 controls the system and interconnects the various devices. A standard IBM-compatible computer is used in the preferred embodiment. The JDS Uniphase SWS15100 is equipped with a commercial software package and interconnects with the computer to control the operation and triggering of laser light source 10. The computer records the intensity measurements from the receiver 90 across an entire grid pattern of the optical plate 50, and relates each reading with the concurrent wavelength reading.

As will be better appreciated from the explanation of the FIG. 2 preferred embodiment method of the invention, there is first specified and designed a computer model of the desired finished optical plate, using a standard computer design program for thin film optical coatings. Examples of commercially available programs include Film Star and Essential Macleod, both of which have been demonstrated to work with the invention. These computer modeling techniques permit specifying the type of material, the medium and the approximate thickness. The model data is then extrapolated to generate the refractive index and intensity data at particular wavelengths resulting from the selection of material, medium and thickness.

The model data is then entered into computer 100 as the baseline data set with which each point of measurement on optical plate 50 is compared for generating the computer controlled work routine for localized reduction of the apparent high spots on plate 50, (the refractive index being assumed to be constant throughout the plate).

Reiterating this aspect of the invention, based on the comparison of the optical path performance of the optical plate to the computer model data, the software algorithm computes the apparent or optical thickness and actual variation in thickness across the grid of plate 50 based on an assumed constant refractive index for the plate under process. Computer 100 then generates a work routine to polishing machine 110, for a localized reduction in thickness that should bring plate 50 closer to the optical performance or spectral response of the computer model. The work order is then executed at polishing machine 110, to polish the "high" sections of the optical plate 50, and the plate is then subjected to another cycle of optical performance measurement to check the results of the polishing routine, until the process brings the plate to within acceptable optical tolerances.

It will be apparent to those skilled in the art that neither the method nor apparatus of the invention is dependent upon which of the two plane parallel surfaces the reduction is executed; but only on the optical result of the localized reduction in the apparent "high spots" of the distance between the two surfaces, as plotted by comparing the optical measurement data of the specimen under process to the previously created computer model of the intended result.

A QED Model MRF Polishing Machine is used in the preferred embodiment apparatus. The polishing and measuring steps can be repeated. The tolerance of the finished optical plates can be extremely close to the model by making the process a closed loop that continues to measure and polish the plates until the variations are within tolerance. Variations in thickness in the range of 5 nanometers or less are achievable by this automated process, which provides cost-effect production of plates of optical performance suitable for many applications.

Figure 2A:
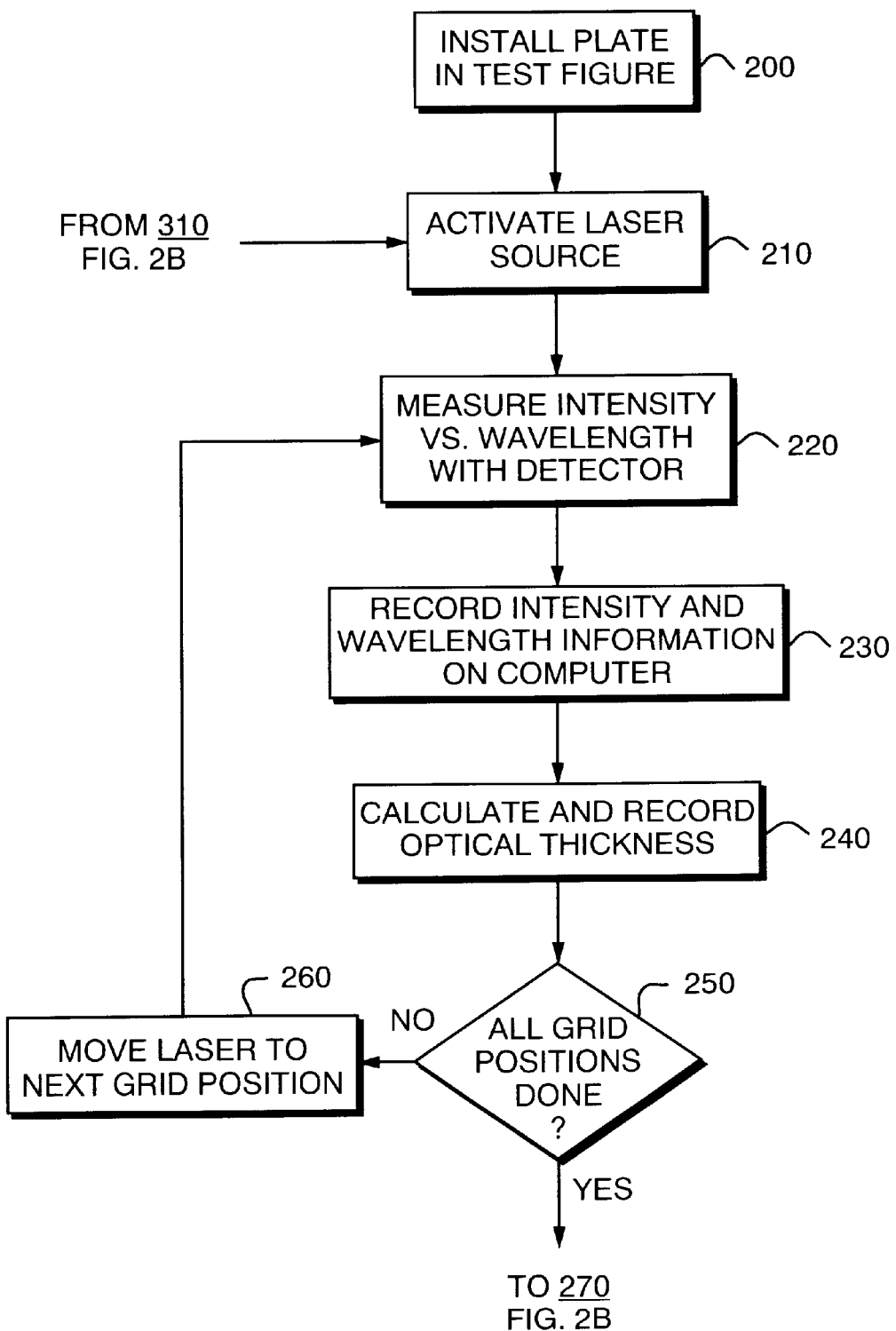
FIG. 2 is a flowchart of a preferred embodiment process of the invention.
Figure 2B:
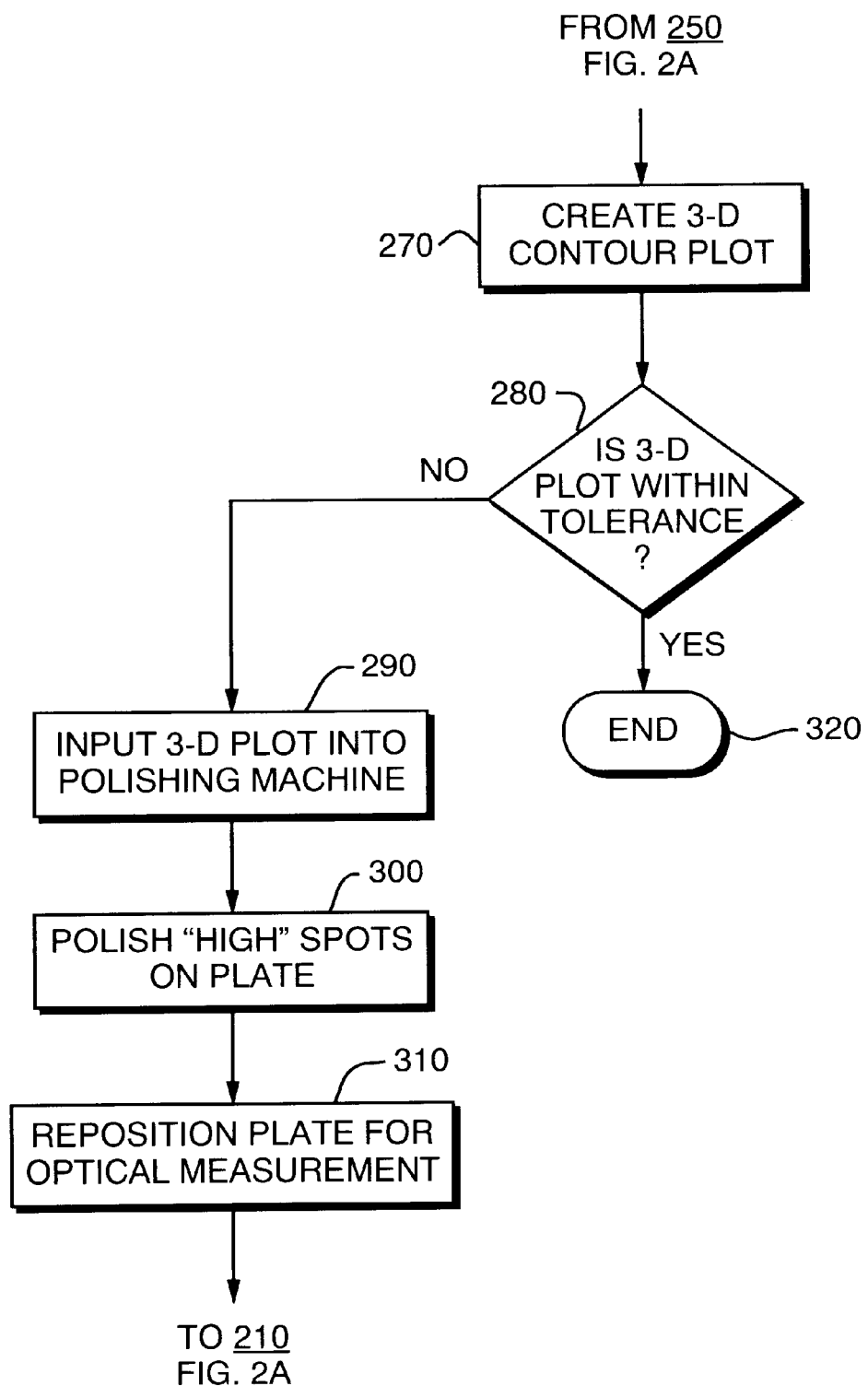

Referring now to FIGS. 2A and 2B, there is shown the basic step-by-step processing of a preferred embodiment method of the invention. The process steps include for clarity references to an apparatus which are easily associated with the preferred embodiment apparatus of FIG. 1, or with logical variations of the apparatus intended to be within the scope of the invention.

Note, as described above, the preferred process presented and described presumes the prior creation and availability of a computer model of the intended final result and the establishment of a grid coordinate system size and density to be used by the process for transmitted light intensity measurements through the optical blanks.

Also as stated for the apparatus embodiment, the invention is applicable to an optical device defined more generally as three layers of optically transparent materials, the interfaces of which define two plane parallel optical surfaces. While the plate described in this embodiment is a solid, it could be otherwise, as is apparent from the general definition of the plane parallel optical surfaces. An air medium on either side of the plate is again the norm for this embodiment, but other mediums including solids, liquids and gases are possible and are within the scope of the invention.

The two plane parallel surfaces, however configured, are first installed (200) in the plate holding test fixture of the apparatus being used to conduct the process and oriented to an initial starting position for rotation through the coordinates of the pre-determined grid system of surface area measurements.

The tunable laser source or other suitable light source is activated (210) and the light beam is directed optionally to the wavelength meter if needed, or through a light filter if needed, and hence directed at the optical plate under process, via the fiber optic cable and collimating lens or by such other means as the apparatus provides. The light source is controlled by the system computer to coordinate system execution of the process.

The receiver or light detector measures (220) the intensity of the light beam transmitted through the plate under process, at the same time the wavelength is being captured. As explained in the description of the apparatus, the relevant wavelength may be established on the light source side of the plate, as by a calibrated light source or filter, or on the receiving side of the plate, as by a filter or a wavelength discriminating receiver of some type. The wavelength and intensity data for that grid coordinate is recorded (230) on the computer and processed via algorithms that assume a constant refractive index, to calculate and record (240) the apparent or optical thickness for that point on the plate under process, the refractive index being assumed to be constant.

If at decision point (250) measurements and calculations at all grid coordinates have been done, the process advances to step 270 below. If not, the plate holder and plate are then repositioned (260) relative to the light beam, to place the light beam to the next grid coordinate and the light source activated (210) for the next grid position reading.

When all readings have been satisfied and all data is in the system computer for this round of measurement, the computer compares the plate measurement data to the computer model's data, assuming the refractive index of the plate to be constant, and creates (270) a three dimensional contour plot or matrix of the optical path apparent variation in plate thickness over the entire surface of the plate.

The computer then compares (280) the contour plot of optical variation to the user's tolerance level. If at decision point (280) the contour plot is within the tolerance permitted by the user, the process is complete and the program terminates (320), the plate data being available for such record keeping as may be desired. If not, the contour plot data is directed (290) into a computerized re-polishing machine as a job routine for reducing the apparent high spots in the contour map by localized polishing action.

The optical surface of the plate is then polished (300), in accordance with the job routine to reduce the high spots. After the optical plate has been polished, or re-polished as the case may be, the plate is repositioned (310) at the initial grid position for another optical check, beginning with prior step (210) activating the light source. The process repeats the optical check and polishing routines described, working towards the objective of reducing the plate under process until it matches the optical performance of the computer model, within a tolerance level acceptable to the user. Eventually the process must terminate with a plate of acceptable optical quality, unless the process fails for other pre-determined out-of-tolerance conditions or apparatus malfunctions.

Figure 3:
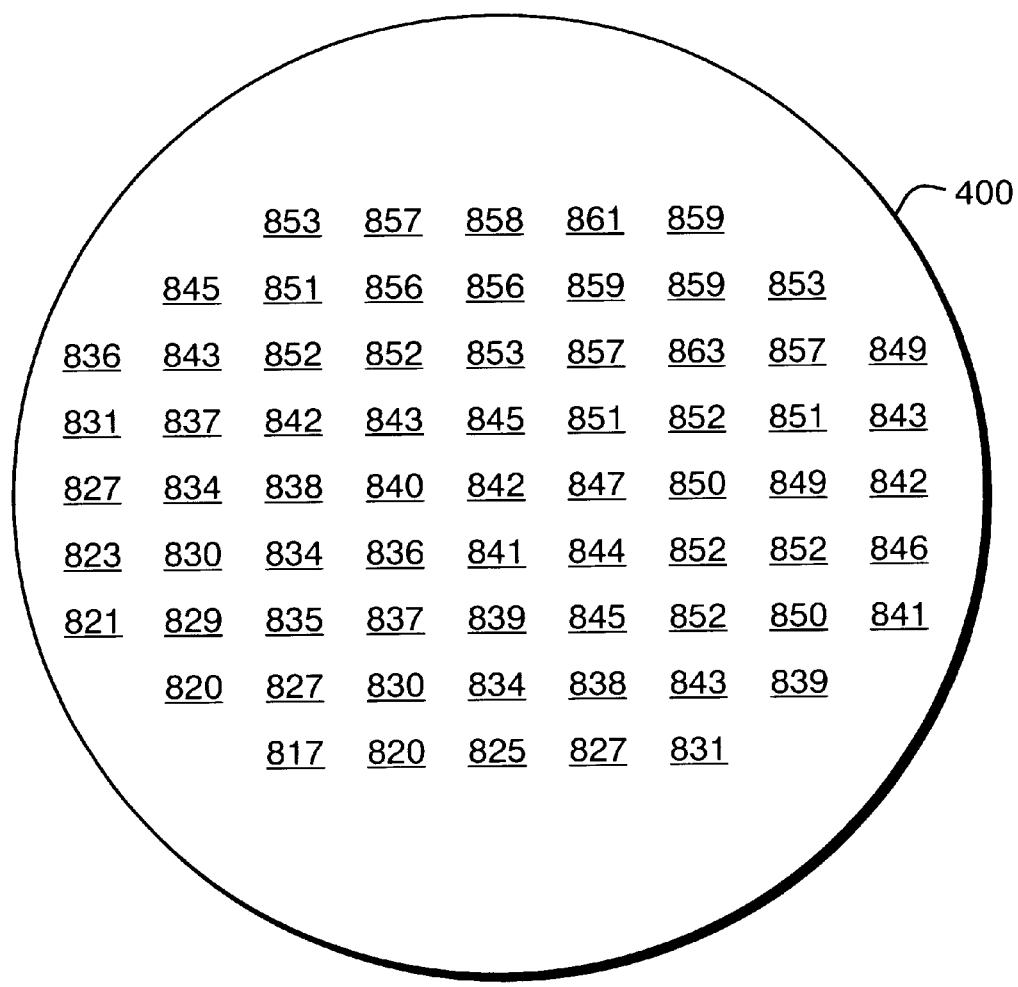
FIG. 3 is a representative presentation of the preferred embodiment grid pattern of a sample plate in process.

Referring now to FIG. 3, there is illustrated a sample measurement data matrix defining a contour plot as describe above. The optical plate 400 in this example is 50 mm (millimeters) in diameter and uses 69 coordinate points in the grid. Each grid coordinate is 5 mm apart, although closer spacing, higher density grids with spacing as close as 1 mm are feasible. The numbers at each location represent in nm (nanometers) the optical thickness as calculated from the light measurement data by the computer algorithm. The goal of the present invention is to remove optical thickness variations of low spatial frequencies, in the order of as low as one to five millimeters, reflected in the variations in plate thickness at adjacent points on the grid.

For example, the top row measurements 853, 857, 858, 861, and 859 indicate variations in thickness or distance between the two plane parallel surfaces of from 853 to 861 nm—or 8 nm. The variation from one grid coordinate to another indicates which localized sections of the surface should be polished to reduce variability and provide a more uniform optical performance. In the apparatus embodiment, the system computer controls the light beam to test fixture positional relationship for sequentially repositioning the light beam at successive grid locations, until measurements and calculations at each grid location have been recorded.

The present invention has been particularly shown and described with respect to certain preferred embodiments of features in the written description, figures, and claims. However, it should be readily apparent to those of ordinary skill in the art that various changes and modifications in form and details may be made without departing from the spirit and scope of the invention.

By way of example, there is within the scope of the invention, a process for measuring optical performance variations over the working surface area of two plane parallel optical surfaces for the transmission of light, consisting of the steps of measuring the intensity of light transmitted through the optical surfaces at each of at least two measuring points of known spatial relationship on the working surface area, calculating the variation in optical thickness of the optical surfaces between the measuring points by comparing the wavelength and intensity of light measured transmitted through each point on the surface to a computer model of desired optical performance while assuming the refractive index of the plane parallel optical surfaces is constant across the full working surface area.

As explained elsewhere, optical thickness for the purpose of this disclosure is a function of the actual thickness and the refractive index. By assuming refractive index to be uniform or constant over the working surface area of the optical device, variations in optical thickness are equivalent to actual variations in the thickness of the material defining the two optical surfaces. At least two measuring points are required in order to show a variation in optical thickness over the surface area in the form of the 3-D contour map. The at least two points are preferably a multiplicity of points uniformly distributed over the working surface area so as to provide a useful resolution of the optical variations in the device.

The process is logically extended by then reducing the actual thickness between the optical surfaces at the computer selected high points of the contour map so as to reduce the equivalent optical thickness variations to closer to the desired uniform optical quality across the working surface area of the wafer.

As a more detailed example of the invention, there is a process for measuring optical variations over the working surface area of two plane parallel optical surfaces for the transmission of light, consisting of the steps:

(a) Designing a computer model of the optical surfaces having a desired optical quality.

(b) Preparing or using an already prepared optical blank or wafer having plane parallel optical surfaces, where the blank is fabricated with a pre-calculated amount of excess thickness, preferably 100 to 200 microns, between the optical surfaces sufficient to absorb the localized reduction in thickness aspect of the invention. The optical blank may be a wafer fabricated of silicon dioxide.

(c) Projecting a light source on the first side optical surface and hence through the optical blank at each of at least two measuring points of known spatial orientation on the working surface area, the location of the points or spatial orientation as to the surface area being held in the process computer.

(d) Receiving light transmitted through the optical blank from the light source, at a receiver directed at points on the second side optical surface coincident to the points of entry on the parallel first side optical surface, the receiver being connected to the process computer.

(e) Measuring and holding within the computer the respective intensity of the light received through each of the coincident measuring points.

(f) Calculating an optical thickness number for each measuring point on working surface area by comparing the wavelength and respective intensity of the transmitted light at each measuring point to the computer model while assuming the refractive index of the optical blank to be constant.

(g) Compiling the spatial orientation location data of the measuring points and the respective optical thickness numbers into a computer representation of a three dimensional contour map of optical thickness variations of the working surface area.

(h) Comparing the degree of optical variations evidenced by the contour map to the desired optical quality and if within tolerance then exiting the process and if not then, (i) Generating a thickness reduction order for localized reduction of some of the excess thickness of the optical blank at points corresponding to the higher points of variation on the contour map so as to enable a reduction of the equivalent optical thickness variations across the working surface area to closer to the desired optical quality.

(j) Executing the reduction order, and (k) Repeating steps (c) through (h) until the process is complete or fails for other reasons.

Wavelength and intensity of transmitted light being the required data to get to the intended result, the process may include a step for determining the actual, contemporaneous wavelength of the transmitted light received at the receiver during the measuring of light intensity at each point, rather than assuming a known or constant wavelength based on general equipment specifications. The determination can done several ways, by incorporating suitable equipment into the apparatus and steps in the process, as have been previously discussed.

The preferred spacing of measuring points on the optical surface area found to be most useful to achieve the desired uniform optical qualities provides for the points to be arranged as a uniform pattern or grid with row and column spacing in the range of about between one and five millimeters. This yields a contour map, reduction order, and localized reduction operation of satisfactory resolution to affect the desired improvement in uniformity of optical performance of transmitted light.

The above process steps of calculating, compiling, comparing and generating the reduction order are preferably done on a process control computer coupled to the light source and receiver. The reduction order may be done as a polishing operation where generally only one optical surface is subjected to localized polishing of the high points of said contour map, although either or both sides may be treated. Ion beam milling or other methods of localized reduction that can respond to the resolution and thickness requirements are within the scope of the invention.

An additional example of the invention is an apparatus for measuring plane parallel optical surfaces for uniform optical performance or quality across the working surface area of the optical surfaces for transmitting light, consisting of a light source, light receiver, and computer coupled together for measuring the intensity of light transmitted through the optical surfaces at each of at least two points of known spatial relationship on the working surface area, a computer program executable within the computer for calculating and generating a computer representation or equivalent of a three dimensional contour map of the optical thickness variation between the optical surfaces at each said point by comparing the wavelength and intensity of the light transmitted through the blank at each measuring point, to a previously constructed computer model of the desired optical performance, that was constructed with the assumption that the refractive index of the plane parallel optical surfaces is constant across the surface area.

Again, the two points are preferably a multiplicity of points uniformly distributed across the working surface area. The plane parallel optical surfaces may be a layer of light transparent material the opposing sides of which constitute the optical surfaces. The apparatus may include a polishing machine or other thickness reduction device connected to the computer for reducing the actual thickness of the middle layer at computer selected high points of the contour map. The polishing or reduction in thickness being sufficient in actual depth so as to reduce the variation in optical thickness between the high and low points of the contour map.

As in the process, the light source, receiver and computer may be further configured for determining the contemporaneous wavelength of the transmitted light at each point at the time of measuring the intensity. There may also be a holding fixture configured for controlled step motions for distributing the several points over the working surface area in accordance with a predetermined uniform pattern of known spacing.

Yet another apparatus consists of a computer and program for creating a computer model of desired optical performance, a fixture for holding an optical blank where the blank may be an optically transparent layer or wafer of material the opposing surfaces of which constitute two plane parallel optical surfaces. The material may be silicon dioxide.

There is a light source directed at a reference point on one side of the fixture for applying a light beam at a selected first measuring point on and normal to the working surface area of the blank when mounted in the fixture, a receiver on the other side of the fixture for receiving transmitted light coming through the blank from the light source, the receiver being directed to a coincident reference point on the other side of the fixture.

The fixture may be configured for moving the blank laterally in selected directions and amounts with respect to the reference point, as controlled by the computer, so as to enable selection of at least one additional measuring point on the working surface area to be subjected to the light beam. The spatial orientation of each additional measuring point with respect to the first measuring point on the working surface area is thus known by the computer for related calculations.

The apparatus is configured for determining and retaining the intensity of the transmitted light received at the receiver from each point, and the computer and program are configured for calculating the optical thickness of the optical blank or wafer at each point on the working surface area by comparing the wavelength and respective intensity measurement to the computer model while assuming the refractive index of the optical blank to be constant. The matrix of spatial orientation of the points and the respective calculations of optical thickness at each point are used to make up a computer representation or simulation of a three dimensional contour map of optical thickness variation over the working surface area.

The computer is further configured for generating a reduction order from the above information, for localized reduction in actual thickness of the optical plate at high points of the contour map, in an amount sufficient to reduce the actual thickness in the area of each high point, and thereby the equivalent optical variation, over the working surface area, the order being directed to a connected machine for executing the reduction order. The machine may be a surface polishing machine.

There may be a wavelength meter for determining the wavelength of the light received at said receiver. There may be a light filter for passing a known wavelength of light for determining the wavelength of light received at the receiver. The computer program may be configured to assume wavelength of light received at the receiver to be constant for all measuring points in accordance with a programmed number. The computer and process program may include a commercially available software program for modeling optical devices. The light source may be a laser source.

The apparatus may be configured for automated repetitive loading of optical blanks, and processing and removal of finished plane parallel optical surfaces of the desired performance. It may be further configured for measuring intensity of transmitted light on a first optical blank in the fixture, while concurrently reducing or polishing a second optical blank based on a prior reduction order, at a reduction machine station such as a polishing machine, and have an automated transport mechanism for interchanging or exchanging the first and second optical blanks between the two stations, so that the total capability of the apparatus is being more effectively utilized.

The reduction machine may be a polishing machine. The polishing machine may be a QED Model MRF Polishing Machine or equivalent; Applicant making no claim to the trademark.

Additional objects and advantages of the present invention may be further realized and attained by means of the instrumentalities and combinations within the scope of the claims. The drawings and description are to be regarded as illustrative in nature, and not as restrictive.

What is claimed is:

1. A process for determining variations in optical thickness over the working surface area of two plane parallel optical surfaces, comprising:

predefining at least two points on one of the optical surfaces, each of the at least two predefined points having a respective corresponding point on the other of the optical surfaces;

transmitting light, having a wavelength, through the two optical surfaces;

measuring the intensity or light transmitted through said optical surfaces at each of the at least two points and its corresponding point;

calculating an optical thickness between each or the at least two points and its corresponding point by comparing the wavelength and measured intensity of said light transmitted trough tat point and its cot-responding point to a model optical performance, assuming the refractive index of said piano parallel optical surfaces is constant across said working surface area; and determining the variation in the optical thickness over the working surface area, based on differences in the calculated optical thickness.

2. A process according to claim 1, said at least two points being a multiplicity of points uniformly distributed over said working surface area.

3. A process according to claim 2, further comprising:

reducing the actual thickness between one of the at least two points and its corresponding point so as to reduce the variations in optical thickness in said working surface area.

4. The process according to claim 1, wherein:

the light is transmitted while varying a wavelength of the transmitted light;

the intensity of the transmitted light is measured as a function of the wavelength of the transmitted light; and the measured intensity of the transmitted light varies with the varying of the wavelength of the transmitted light.

5. A process for measuring optical variations over the working surface area of two plane parallel optical surfaces of an optical blank, comprising:

preparing the optical blank with excess thickness;

projecting light, having a wavelength, on one of said optical surfaces, a portion of the projected light passing through the other of said optical surfaces;

receiving said portion of projected light passing through said other optical surface at predefined respective points on said other optical surface;

measuring the intensity of said received light that passed through each of said predefined respective points;

calculating an optical thickness number for each of said predefined respective points by comparing the wavelength and said measured intensity of the received light that passed trough that point to a model of the optical blank having an optical quality, assuming the refractive index of said optical blank to be constant;

compiling said optical thickness numbers into a representation of a three dimensional contour map of optical thickness variations of said working surface area;

comparing said contour map to said optical quality;

determining if the optical blank is within tolerance based on the comparison;

exiting said process if the optical blank is determined to be within tolerance;

generating a reduction order for localized reduction of said excess thickness of said optical blank corresponding to a higher point of said contour map so as to reduce said optical thickness variations over said working surface area;

executing said reduction order; and repeating the projecting through the exiting.

6. A process for measuring optical variations according to claim 5, wherein the measuring further comprising determining the wavelength of said received light during said measuring of said intensity.

7. A process for measuring optical variations according to claim 5, said projected light being laser light.

8. A process for measuring optical variations according to claim 5, said at least two points being a matrix of uniformly distributed points.

9. A process for measuring optical variations according to claim 8, said matrix of uniformly distributed points comprising points spaced apart at about between one and five millimeters.

10. A process for measuring optical variations according to claim 5, wherein the projected light is narrow band laser light of known wavelength.

11. A process for measuring optical variations according to claim 5, wherein the projected light is broadband light Filtered at a known wavelength.

12. A process for measuring optical variations according to claim 5, wherein the projected light is broadband light and the received light is narrow band light of known wavelength.

13. A process for measuring optical variations according to claim 5, wherein at least one of said calculating, compiling, comparing, determining, exiting, and generating are carried out on a process control computer.

14. A process for measuring optical variations according to claim 5 wherein executing said reduction order includes a polishing operation with at least one of said optical surfaces being subjected to localized polishing.

15. A process for measuring optical variations according to claim 5 said optical blank being a wafer fabricated of silicon dioxide.

16. An apparatus for measuring plane parallel optical surfaces for uniform optical performance across a working surface area, comprising:

a light source, a light receiver, and a computer coupled together fir measuring intensity of light from the light source transmitted through said optical surfaces at each of at least two predefined points of known spatial relationship on one of said optical surfaces; and a computer program executable within said computer for generating data representing a three dimensional contour map of optical thickness variation between said optical surfaces at each said point by comparing a wavelength and the measured intensity of said transmitted light received by the receiver after transmission through each said point to a pre-selected optical performance, assuming the refractive index of said plane parallel optical surfaces to be constant.

17. An apparatus for measuring plane parallel optical surfaces for uniform optical performance according to claim 16, said at least two points being a multiplicity of points uniformly distributed across said working surface area.

18. An apparatus for measuring plane parallel optical surfaces for uniform optical performance according to claim 17, said light source being a laser light source, and said apparatus further comprising:
- a holding fixture for said plane parallel optical surfaces, said fixture configured for controlled step motions for moving said working surface area in accordance with the uniform distribution of the multiplicity of points and so that light from the light source is transmitted through said optical surfaces at each of the multiplicity of points.

19. An apparatus for measuring plane parallel optical surfaces for uniform optical performance according to claim 16, said plane parallel optical surfaces comprising a layer of light transparent material the opposing sides of which constitute said optical surfaces, and said apparatus further comprising:
- a polishing machine connected to said computer for reducing an actual thickness of said layer at computer selected high points of said contour map so as to reduce the variation in said optical thickness between said points.

20. An apparatus lip measuring plane parallel optical surfaces for uniform optical performance according to claim 16 wherein said light source, said receiver and said computer are further configured for determining said wavelength of said light at each said point at the time of measuring said intensity.

21. The process according to claim 16, wherein:
- the light source is configured to transmit the light through the optical surface while varying a wavelength of the transmitted light;
- the intensity of the received light is measured as a function of the wavelength of the transmitted light; and
- the measured intensity of the received light varies with the varying of the wavelength of the transmitted light.

22. An apparatus for producing plane parallel optical surfaces with uniform optical performance over the working surface area of said optical surfaces, comprising:
- a computer and program for creating a model of optical performance;
- a fixture for holding an optical blank, said blank comprising an optically transparent layer of material the opposing surfaces of which constitute said two plane parallel optical surfaces;
- a light source directed at a first reference point on one side of said fixture for transmitting light through a selected first of a plurality of predefined measuring points on said working surface area of said optical blank;
- a receiver on the other side of said fixture for receiving the transmitted light beam-passing through said optical blank, said receiver directed to a second reference point on the other side of said fixture and coincident to the first reference point;
- said fixture configured for moving said blank laterally in selected directions and amounts with respect to said reference points so as to enable a second of said plurality of measuring points on said working surface area to have said transmitted light pass there trough;
- said computer and program configured for calculating an optical thickness of said optical blank at each of said first and second measuring points on said working surface area by comparing a wavelength of the transmitted light and a respective intensity of said transmitted light received at said receiver from each of the first and the second measuring points on said working surface area to said model, assuming the refractive index of said optical blank to be constant, and generating a representation of a three dimensional contour map of optical thickness variation over said working surface area based on the comparison;
- said computer further configured for generating a reduction order for localized reduction in actual thickness of said optical blank at selected high points of said contour map so as to reduce said optical thickness variation over said working surface area; and
- a machine for executing said reduction order.

23. An apparatus for producing plane parallel optical surfaces according to claim 22, further comprising:
- a wavelength meter for determining the wavelength of said transmitted light received at said receiver.

24. An apparatus for producing plane parallel optical surfaces according to claim 22, further comprising:
- a light filter for filtering said transmitted light received at said receiver for the wavelength.

25. An apparatus for producing plane parallel optical surfaces according to claim 22 said program configured to assume the wavelength of said transmitted light received at said receiver to be constant for said plurality of predefined measuring points.

26. An apparatus for producing plane parallel optical surfaces according to claim 22, said program comprising a commercially available software program for modeling optical devices.

27. An apparatus for producing plane parallel optical surfaces according to claim 22, said light source being a laser source.

28. An apparatus for producing plane parallel optical surfaces according to claim 20, said optical blank comprising a wafer fabricated of silicon dioxide.

29. An apparatus for producing plane parallel optical surfaces according to claim 22, said machine for executing said reduction order comprising a polishing machine coupled to said computer.

30. A process for determining an optical thickness between two plane parallel optical surfaces, comprising:
- directing a coherent light beam to die optical thickness between the two plane parallel optical surfaces, wherein a first portion of the light beam is reflected by and a second portion of the light beam is transmitted through the two plane parallel optical surfaces;
- varying the wavelength of the coherent light beam directed to die optical thickness from a first wavelength to a second wavelength;
- measuring an illumination intensity of one of the reflected first portion mid die transmitted second portion of the coherent light beam as a function of the first wavelength;
- measuring an illumination intensity of one of the reflected first portion and die transmitted second portion of the coherent light bean, as a function of the second wavelength;

comparing the measured illumination intensity versus the first wavelength and the measured illumination intensity versus the second wavelength, with each of a plurality of illumination intensity versus illumination wavelength profiles for each of a plurality of optical thickness; and determining the optical thickness between the two plane parallel optical surfaces based on the comparison.

31. The process of claim 30, wherein at least one of the plurality of optical thickness is substantially equal to the optical thickness between the two plane parallel optical surfaces.

32. The process of claim 30, wherein:

the optical thickness between the two plane parallel optical surfaces is determined by identifying which of the plurality of illumination intensity versus illumination wavelength profiles best matches the measured illumination intensity versus the first wavelength and the measured illumination intensity versus the second wavelength, based on the comparison.

33. The process of claim 30, wherein the optical thickness between the two plane parallel optical surfaces forms a portion of an etalon.

34. The process of claim 30, further comprising:

generating the plurality of illumination intensity versus illumination wavelength profiles for each of the plurality of optical thicknesses, assuming a uniform index of refraction throughout the optical thickness.

35. The process of claim 30, further comprising:

polishing at least one of the two plane parallel optical surfaces based on the determined optical thickness.

36. A process for determining an optical thickness between two plane parallel optical surfaces, comprising:

directing a variable wavelength light source to pass through the optical thickness between the two plane parallel optical surfaces while varying the wavelength, wherein a constructive interference and a destructive interference cause the variable wavelength light source to vary in intensity as it passes through the optical thickness;

measuring the varying intensity as a function of the varying wavelength;

comparing the measured varying intensity versus the varying wavelength wit each of a plurality of varying intensity versus wavelength profiles for each of a plurality of optical thicknesses; and determining the optical thickness between the two plane parallel optical surfaces based on the comparison.

37. The process of claim 36 wherein:

the optical thickness between the two plane optical surfaces is determined by identifying by matching the measured varying intensity versus the varying wavelength with one of the plurality of varying intensity versus wavelength profiles.

38. An apparatus for determining an optical thickness between two plane parallel optical surfaces, comprising:

a light source configured to direct light of varying wavelength to the optical thickness between the two plane parallel optical surfaces, wherein constructive interference and destructive interference cause the light to vary in intensity as it passes through the optical thickness;

a detector configured to measure the varying intensity us a function of the varying wavelength;

a memory configured to store a plurality of varying intensity versus wavelength profiles, each profile corresponding to a known optical thickness; and a computing device configured to compare the measured varying intensity with each of the stored plurality of varying intensity versus wavelength profiles, and to select the known optical thickness corresponding to the one of the compared plurality or varying intensity versus wavelength profiles that substantially matches the measured varying intensity.

39. The apparatus of claim 38, further comprising:

a polishing device configured to polish at least one of the two plane parallel optical surfaces based on the selected optical thickness.

* * * * *

UNITED STATES PATENT AND TRADEMARK OFFICE
CERTIFICATE OF CORRECTION

PATENT NO. : 6,639,682 B2
DATED : October 28, 2003
INVENTOR(S) : Richard A. Neily and William McCreath It is certified that error appears in the above-identified patent and that said Letters Patent is hereby corrected as shown below:

Column 4,
Line 42, delete "as ion", insert -- as an ion --

Column 13,
Lines 17 and 20, delete "or", insert -- of --
Line 23, delete "tat", insert -- that --
Line 23, delete "cot-responding", insert -- corresponding --
Line 25, delete "piano", insert -- plane --
Line 62, delete "trough", insert -- through --

Column 14,
Line 33, delete "Filtered", insert -- filtered --
Line 55, delete "fir", insert -- for --

Column 15,
Line 29, delete "lip", insert -- for --
Line 59, delete "beam-"
Line 67, delete "trough", insert -- through --

Column 16,
Lines 51, 57, 61 and 65, delete "die", insert -- the --
Line 61, delete "mid", insert -- and --
Line 66, delete "bean", insert -- beam --

Column 18,
Line 4, delete "wit", insert -- with --
Line 24, delete "us", insert -- as --

UNITED STATES PATENT AND TRADEMARK OFFICE
CERTIFICATE OF CORRECTION

PATENT NO.   : 6,639,682 B2
DATED        : October 28, 2003
INVENTOR(S)  : Richard A. Neily and William McCreath It is certified that error appears in the above-identified patent and that said Letters Patent is hereby corrected as shown below:

<u>Column 18 (cont'd),</u>
Line 34, delete "or", insert -- of --

Signed and Sealed this

Seventh Day of September, 2004

JON W. DUDAS
*Director of the United States Patent and Trademark Office*